A. C. DODGE.
WEIGHING MACHINE.
APPLICATION FILED JAN. 18, 1906. RENEWED MAR. 16, 1914.

1,105,891.

Patented Aug. 4, 1914.

A. C. DODGE.
WEIGHING MACHINE.
APPLICATION FILED JAN. 18, 1906. RENEWED MAR. 16, 1914.

1,105,891.

Patented Aug. 4, 1914.
12 SHEETS—SHEET 2.

Witnesses
Wm. J. Dolan
John O. Gempler

Alfred C. Dodge Inventor
By his Attorney J. H. Freeman

A. C. DODGE.
WEIGHING MACHINE.
APPLICATION FILED JAN. 18, 1906. RENEWED MAR. 16, 1914.

1,105,891.

Patented Aug. 4, 1914.
12 SHEETS—SHEET 4.

Witnesses
Wm. J. Dolan
John O. Gempler

Alfred C. Dodge Inventor
By his Attorney J. H. Freeman

A. C. DODGE.
WEIGHING MACHINE.
APPLICATION FILED JAN. 18, 1906. RENEWED MAR. 16, 1914.

1,105,891.

Patented Aug. 4, 1914.

A. C. DODGE.
WEIGHING MACHINE.
APPLICATION FILED JAN. 18, 1906. RENEWED MAR. 16, 1914.

1,105,891.

Patented Aug. 4, 1914.
12 SHEETS—SHEET 8.

Witnesses
Wm. J. Dolan
John O. Gemples

Alfred C. Dodge Inventor
By his Attorney J. H. Freeman

A. C. DODGE.
WEIGHING MACHINE.
APPLICATION FILED JAN. 18, 1906. RENEWED MAR. 16, 1914.

1,105,891.

Patented Aug. 4, 1914.

A. C. DODGE.
WEIGHING MACHINE.
APPLICATION FILED JAN. 18, 1906. RENEWED MAR. 16, 1914.

1,105,891.

Patented Aug. 4, 1914.

UNITED STATES PATENT OFFICE.

ALFRED C. DODGE, OF YONKERS, NEW YORK.

WEIGHING-MACHINE.

1,105,891.      Specification of Letters Patent.      Patented Aug. 4, 1914.

Application filed January 18, 1906, Serial No. 296,623. Renewed March 16, 1914. Serial No. 825,157.

*To all whom it may concern:*

Be it known that I, ALFRED C. DODGE, a citizen of the United States, and a resident of Yonkers, Westchester county, State of New York, have invented certain new and useful Improvements in Weighing-Machines, of which the following is a specification.

The invention relates to weighing machines, and it is especially applicable to beam scales.

Objects of the invention are to provide a machine for accurately, rapidly and readily ascertaining weights; to provide a machine adapted to indicate the weight at a single reading and presenting the indication always at the same place; to provide a machine which presents to the eye only the marks and figures which indicate the weighing which is being made; which will give a reading of such character as to enable the finest divisions of weight to be readily observed; to provide a machine wherein a wide range of weight readings may be had within a relatively small compass and by use of simple mechanisms; to provide a machine which shall be of compact structure and of attractive appearance. These objects of the invention will more fully appear hereinafter and other objects of the invention will in part be obvious and will in part be hereinafter set forth.

The invention consists in the novel parts, articles, improvements and combinations herein shown and described.

The accompanying drawings, referred to herein and forming a part hereof, illustrate one embodiment of the invention and also various modifications of mechanisms comprised in such embodiment, the same serving in connection with the description herein to explain the principles of the invention.

Of the drawings: Fig. 19 is a plan view, partly in section and with certain parts broken away, of a modification.

The invention is shown herein as applied to a weighing machine of the simple lever type although it will be understood that in many aspects of the invention it is applicable generally to weighing machines of the beam type.

In the embodiment of the invention illustrated in Figs. 1 to 4, 1 indicates the beam which is pivoted at a point 2 in a suitable support, such as the beam stand 3, carried on a suitable base 4. Attached to one arm of the beam by a suitable pivot connection 5 is a support for the material to be weighed. This support may be of any convenient or suitable form, and is herein shown as comprising a scoop rest 6, a hanger 7, a hanger rod 8, extending into the base and pivotally connected by means of a check 9 which may, in turn, be pivoted to any suitable supporting means, such as the base of the beam stand 3. Mounted upon or connected with the other arm of the beam 1 is a poise 10 which is adapted to have movement relatively to the said beam. Suitable actuating means for moving the poise relatively to the beam are provided. According to certain features of the invention the poise and its actuating means may be of any suitable and convenient construction but according to other features of the invention a poise is contemplated which has movement relative to the beam together with actuating means which has no movement of translation with reference to the beam. In the form illustrated in Figs. 1 to 3 the poise 10 is shown of a substantially circular form and threaded upon a fixed screw rod 11 mounted on some suitable part of the beam, as indicated at 12. It will thus be seen that rotation of the poise will cause it to travel along the screw rod and to thus have longitudinal movement relative to the beam. In the illustrated form the actuating means is shown as comprising a manually operated member 13 journaled so as to have motion of rotation, which motion is communicated by suitable connections to the poise. As herein illustrated the member 13 is connected to a head 15, having rods or arms 16 adapted to take into apertures 17 in the poise, so that the poise will rotate with the head but will be free to have longitudinal movement independently thereof. In accordance with one feature of the invention, the actuating means may comprise a device for modifying the motion between the manually operated member and the poise, and such means are herein shown as a multiplying device. The multiplying device shown comprises an internal gear 18 in the member 13, which meshes with a pinion 19 journaled upon a fixed stud 20 which is carried by the fixed sleeve 21 mounted in the transverse end portion of the beam 1. Meshing with the said pinion 19 is a gearing 22 fixed upon a shaft 23 journaled in the said sleeve 21 and having a rigid connection with the head 15. It will thus be seen that by properly proportioning the said gear train that the movement of the poise relatively to its actuating means may be multiplied as may be found convenient.

According to certain features of the invention, indicating means are contemplated for the purpose of giving the proper readings for ascertaining the weight of the material carried by the support, said indicating means comprising a plurality of graduated members and connections between them and the poise for moving said members each in a degree corresponding to its graduations, the members being arranged to present their respective indications for a single reading. According to other features of the invention the said indicating members are constructed in annular form and are arranged about the path of travel of the poise. According to such features and with such form and arrangement, a mechanism is provided which is simple and compact and also capable of giving a very wide range of weight readings while still allowing a graduation of the indicating devices such as to permit ready readings of the finest divisions of weight. In the illustrated embodiment, accordingly, the said indicating members are shown as being of annular form, a plurality thereof being arranged about a single axis and also about the path of movement of the poise, and located side by side.

Figure 1:
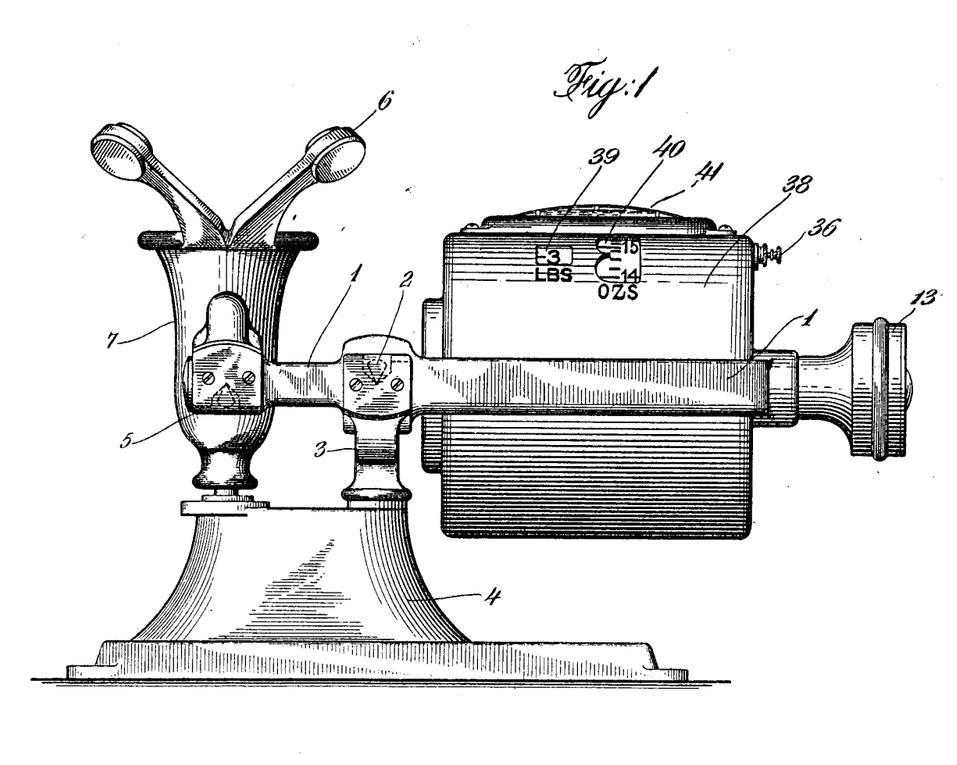
Figure 1 is a front elevation.
Figure 2:
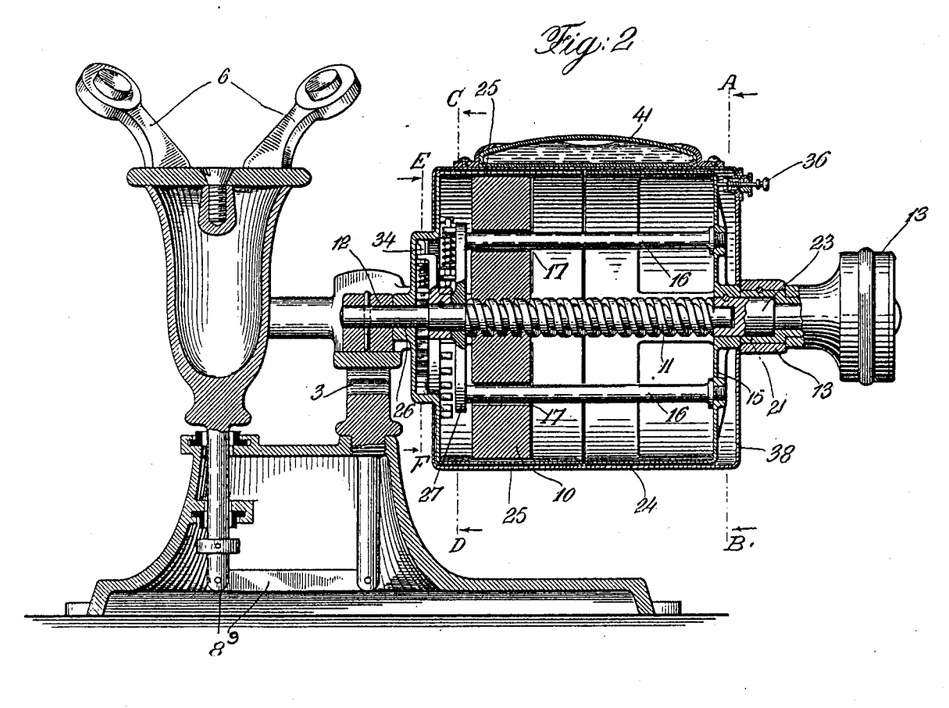
Fig. 2 is a longitudinal section.
Figure 3:
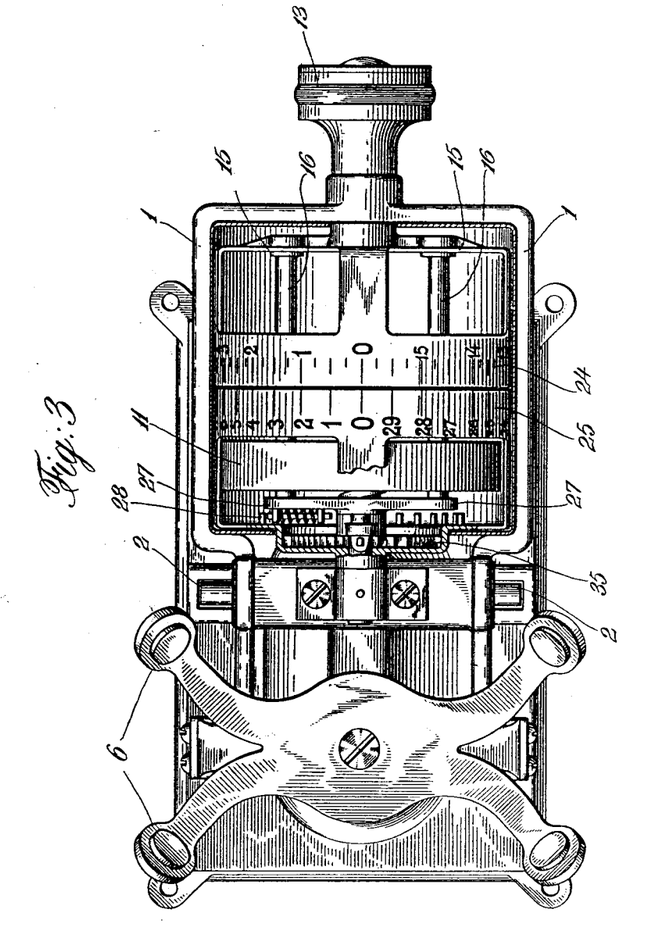
Fig. 3 is a top plan view, with parts broken away and parts in section.
Figure 4:
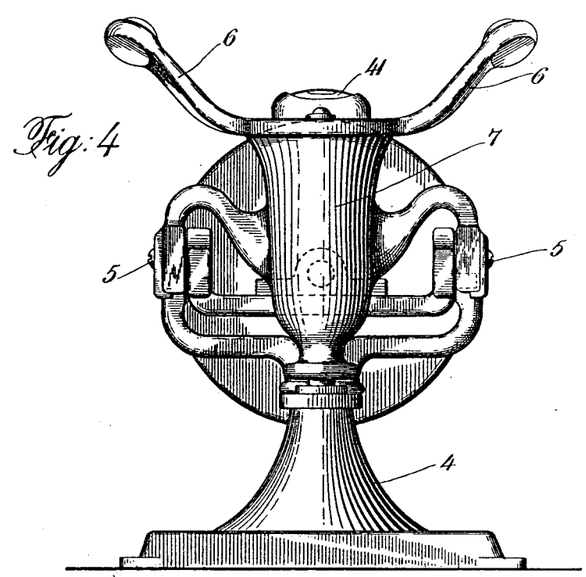
Fig. 4 is an end elevation.
Figure 5:
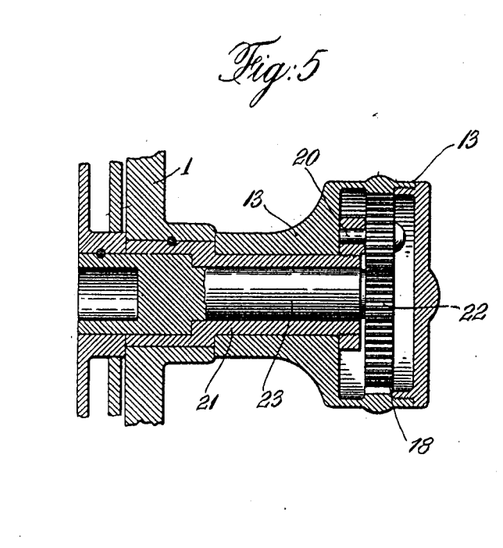
Figs. 5 and 6 are details of the poise actuating means.
Figure 6:
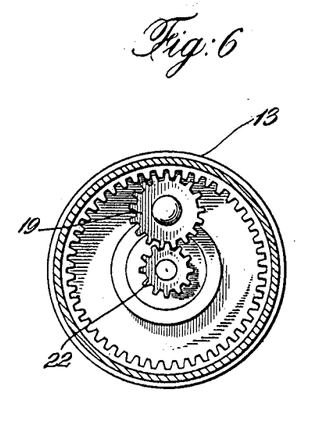
Figure 7:
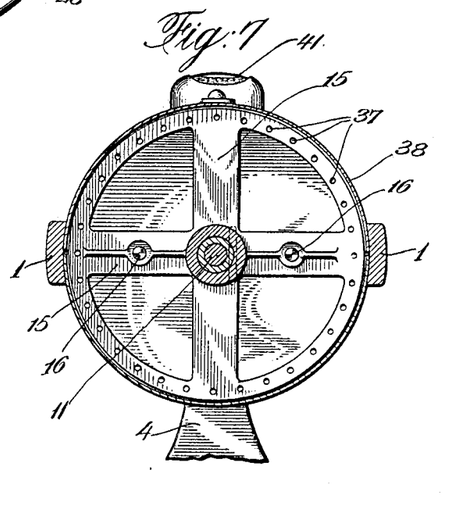
Fig. 7 is a detail sectional view on line A—B of Fig. 2.
Figure 8:
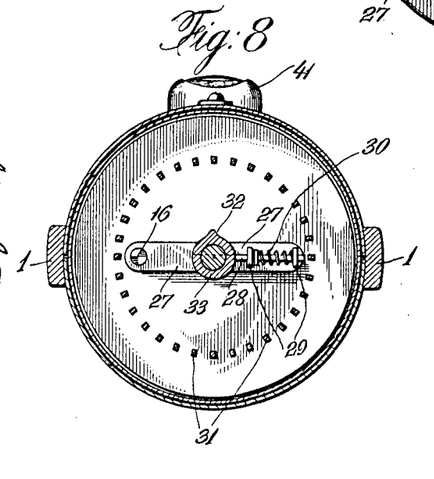
Fig. 8 is a detail sectional view on line C—D of Fig. 2.
Figure 9:
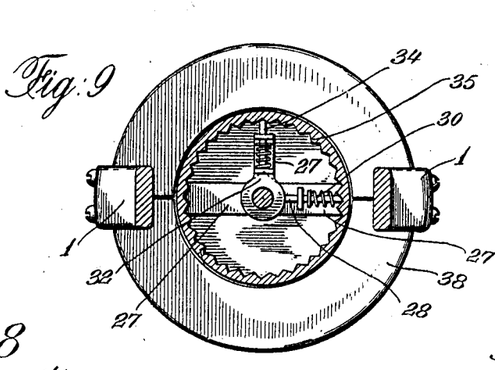
Fig. 9 is a detail sectional view on line E—F of Fig. 2.
Figure 10:
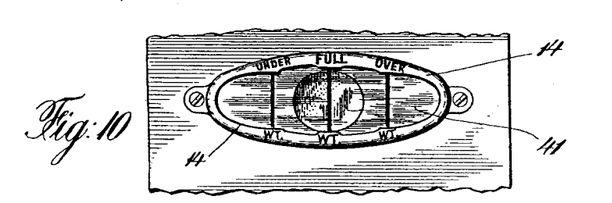
Figs. 10, 11 and 12 are details of the balance indicator.
Figure 11:
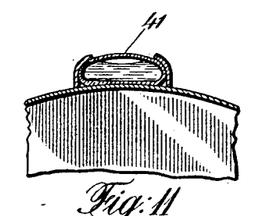
Figure 12:
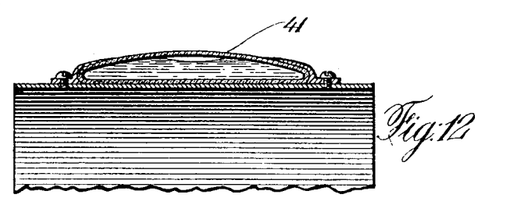

In the form illustrated in Figs. 1, 2 and 3 of the drawings, two indicating members are used, one being graduated to fractions of ounces, and the other to pounds. One of the said members, indicated by the reference numeral 24, is shown connected to the head 15 so as to rotate therewith, and the other, indicated by the reference numeral 25, is shown as journaled at 26 upon the screw rod 11. In this particular arrangement the member 24 is used for ounce graduations and the member 25 for pound graduations. According to certain features of the invention it is contemplated to give one or more of the indicating members a step by step movement and also to provide means for causing one or more of the indicating members to stop at one of a plurality of predetermined points. In the form illustrated in the said figures, the movement of the member 25 is a step by step movement, so that an additional indication of a pound is given at the reading point for each time that the member 24 indicates an additional 16 ounces, which may conveniently be at the end of a complete rotation. As herein shown a series of arms 27 are loosely mounted on the screw rod 11 and are connected to the rods 16. On one of said arms is mounted a movable member 28, adapted to slide in guides 29 and normally held in a retracted position by a spring 30. The said arms 27 it will be understood partake of the rotary movement of the poise 11, the rod 16 and the head, 15, when the member 13 is rotated. Upon the circular end portion of the member 25 and outside the path of the member 28 is arranged an annular series of teeth or notches 31. For the purpose of giving a step by step movement to the indicating member 25 at each rotation of the arms 27, means are provided for throwing the pin 28 outwardly between two of the teeth 31 for a sufficient period to feed the member 25 through a single step. The form of said means herein shown consists of a stationary cam 32 carried upon a collar 33 fixed upon the screw rod 11. Means are provided for the purpose of causing the indicating member 25 to stop in its step by step movement at one of a plurality of predetermined points, such means being herein shown as comprising a spring-pressed detent 34 mounted upon some fixed portion of the machine, such as a lug or standard extending from the collar 33, said detent engaging with a series of beveled teeth 35 carried by said indicating member 25. Means are also provided for causing the indicating member 24 to stop at one of a plurality of predetermined points, and such points may conveniently correspond to the smallest graduations carried by the said member. Such means are herein shown as a beveled spring-pressed pin 36 carried by a relatively fixed part of the machine and having its beveled end adapted to register with an annular series of holes 37 carried in the head 15.

The invention contemplates the providing of means for concealing from view the indicating means with the exception of those portions which are to be read, and for this purpose a casing 38 is provided in the illustrated embodiment. Said casing is shown mounted upon the beam 1, and arranged about the indicating means, the poise, and their connected parts. The beam is shown of a conformation such as to comprise the said casing and its included mechanisms. The casing may be of complete circular form with inclosed ends, thus serving to protect its contained mechanisms from dust and dirt. At a proper and convenient point the said casing is provided with apertures for permitting a reading to be taken from the indicating members and two apertures, 39 and 40, are illustrated, one aperture showing the pound readings and the other the ounce readings. By this arrangement the readings are given with a separate aperture for each denomination and also with the indications composing the reading close together and in substantial alinement.

The invention in one of its aspects contemplates a balance indicator which is very sensitive and accurate. In the form herein shown the said balance indicator 41 comprises a receptacle for a liquid having a suitable float such as a bubble of air or other gas immersed therein. The said receptacle is arranged longitudinally of the beam and is constructed so as to present a different high point for each different position of the beam. The balance indicator comprises also an index member 14 for coöperating with said receptacle, said index member being so marked and positioned as to indicate full, over and under weight. The balance indicator may be mounted in any convenient location and is herein shown as carried upon the casing 38. The sensitive balance indicator, together with the arrangement of the poise, indicating means and casing and the moving means for the poise, as herein set forth, supply a mechanism which provides very effectually for accurate, rapid and ready weight determinations.

Figure 13:
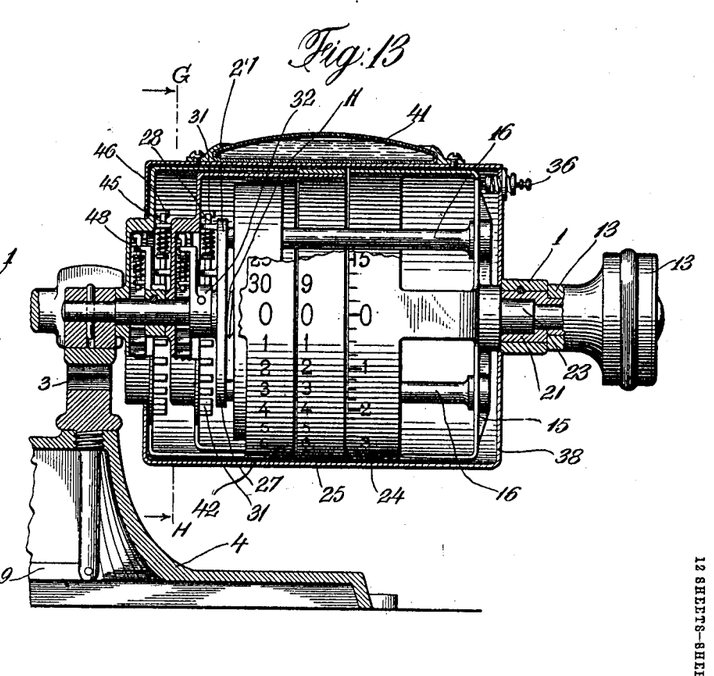
Fig. 13 is a partial longitudinal sectional elevation showing a modification of the indicating means.
Figure 14:
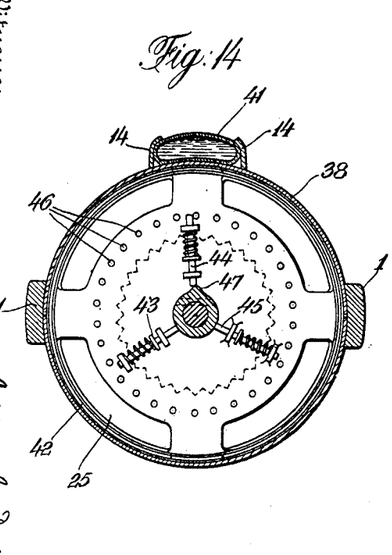
Fig. 14 is a sectional view taken upon the line G—H of Fig. 13.
Figure 15:
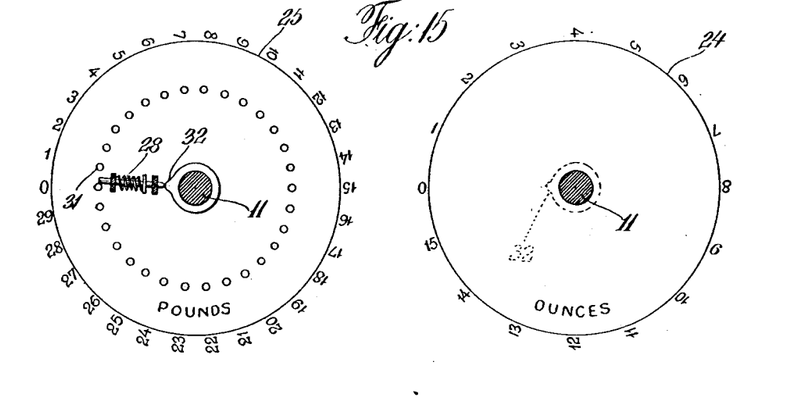
Fig. 15 is a diagrammatic showing of the relation of the indicating members when but two are used.
Figure 16:
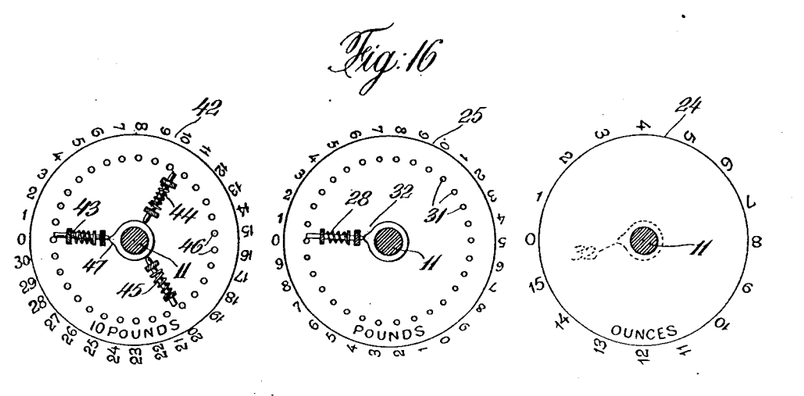
Fig. 16 is a diagrammatic showing of the relation of the indicating members when three are used and bear the relation shown in Fig. 13.

In Figs. 13 and 14 of the drawings is illustrated a modification in which the indicating means are adapted to cover an exceedingly wide range of weight indications within a very small space. In this form the indicating means comprises a plurality of annular indicating members, some of which are graduated to multiples of the units or graduations upon another member, and having, of course, a movement relative thereto in the same ratio as that of their graduations. As herein shown the pound graduations are carried upon two indicating members and, with the arrangement of numerals and graduations substantially as shown, will give weight indications by quarter ounces up to 310 pounds. This range of weight indications is secured, it will be noted, by the addition of but one indicating member. The poise 17 is rotated by suitable means such as the member 13 and has longitudinal movement along a fixed screw rod 11 substantially as in the form illustrated in Figs. 1 to 3. Connections between the member 13 and the poise are provided, and as shown comprise the head 15 and rods 16, the said members constituting part of the connections between the member 13, the poise and the indicating means. The indicating member 24 is shown rigidly connected with the head 15 and the indicating member 25 is connected to the member 24, the member 13, and the poise in practically the same manner as in the preceding form, said connections comprising the arms 27 and the spring controlled movable member 28, having its stationary controlling cam for throwing it intermittently into engagement with the teeth or notches 31. Mounted in a manner generally similar to the member 25 is a third annular indicating member 42, which is likewise connected to the poise and to the other indicating members. As herein shown the said member 42 is connected to the poise through the member 25 and the connections between the said members are generally similar to those between the member 25 and the member 24 and the poise, excepting that the number and arrangement of parts is such as to give the desired different relative movement of the indicating members. By reference to Fig. 16 it will be noted that the indicating member 42 is graduated from 1 to 30 and that the digits are thrice repeated in series on member 25. That is, by coöperation these two members will present readings up to 30 on the member 42 and up to 9 on the member 25, giving a maximum reading of 309 pounds which, plus the indications of the ounces indicator, would give a total maximum reading of 310 pounds. By reason of the members on the indicating member 42 running from 0 to 30 the said member is rotated one step for every one third of a rotation of the member 25, and the connections for moving the said member are constructed and arranged to effect this. Means are therefore provided for engaging the indicating member 42 three times during each rotation of the member 25, in order to give it a step by step movement. As shown, the said means comprise three sliding members 43, 44 and 45, carried on the member 25, and symmetrically arranged with relation thereto, and each adapted to move into engagement with the annular series of teeth or notches 46, but being normally held away therefrom. To move the said members into engagement with the notches a stationary cam 47 is provided upon which each of the sliding members 43, 44, 45, ride up in passing, each thus rotating the indicating member 42 one step. The said member is also shown provided with means for causing it to stop at one of a plurality of predetermined points, and such means are herein shown as substantially similar to the corresponding means already described, and are generally indicated by the reference numeral 48. It will be understood that the use of three indicating members and also the particular arrangement of markings and graduations is illustrative and not restrictive.

Figure 17:
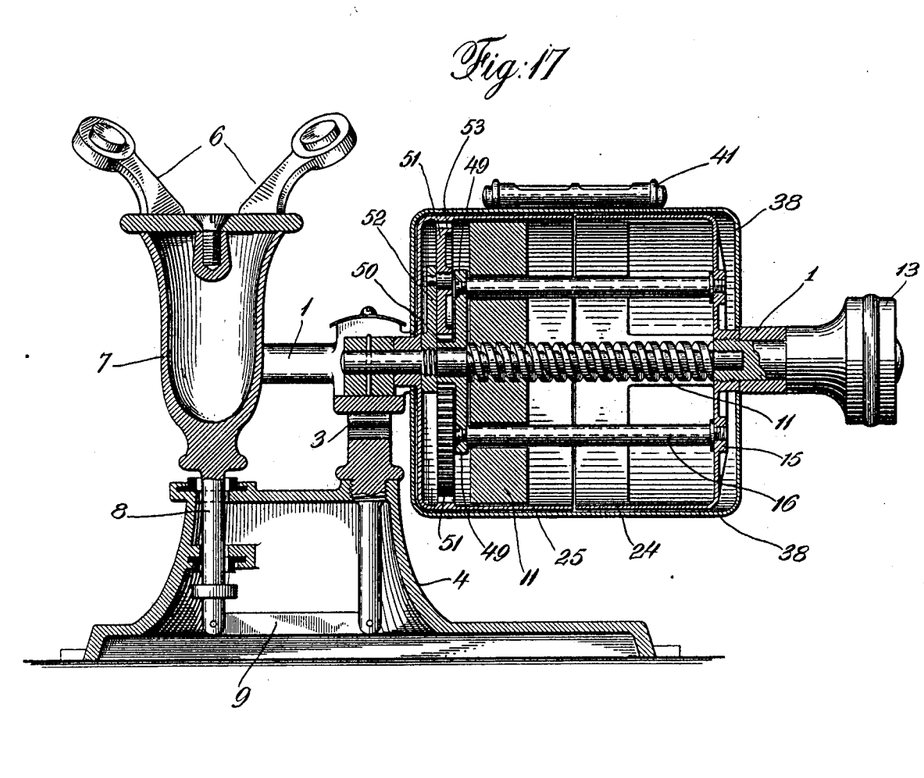
Fig. 17 is a longitudinal section showing a modification of the connections for controlling the indicating means.

In Fig. 17 of the drawings is shown a modification of the form illustrated in Figs. 1, 2 and 3 of the drawings wherein the movement between the indicating members is regular instead of step by step, said modification being shown in connection with a mechanism comprising two indicating members. The arrangement of the poise and indicating members in this modification is substantially the same as shown in the above-mentioned figures, the connections between the indicating members however being different. As shown in the said Fig. 17, instead of the sliding cam controlled member and the annular series of notches previously described as comprising a form of means for producing a step by step movement of the driven indicating member, a form of means is provided for giving a regular movement to the driven indicating member. The form of such means herein shown comprises the arms 49, which are mounted to rotate with the arms 16, and carry rigidly connected to them a pinion 50 meshing with a gear wheel or gear wheels 51 carried upon a fixed part of the machine, such as the arm or arms 52, and meshing with an internal gear 53 formed upon the indicating member 25. Rotation of the member 13, as will be readily understood, will in this case effect a regular movement of all the indicating members.

Figure 18:
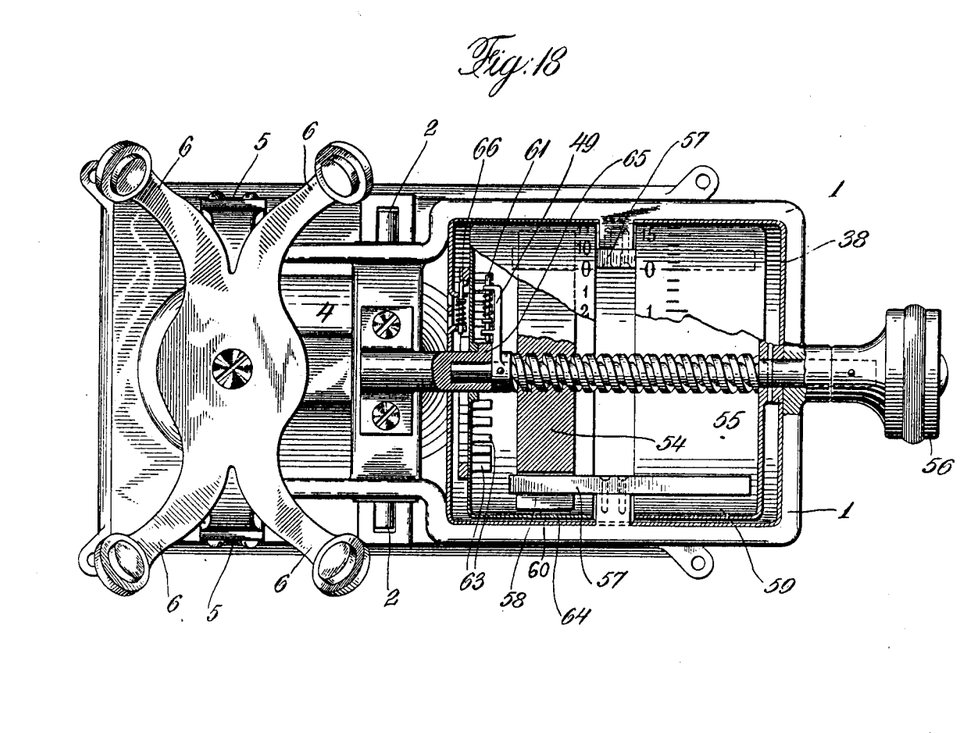
Fig. 18 is a plan view, partly in section and with certain parts broken away, of a modification.

In Fig. 18 of the drawings is shown a modification comprising a somewhat different arrangement of the parts. In this form a movable poise is provided and a plurality of rotary annular indicating members are arranged about the path of travel of the poise. The poise, however, while having movement relatively to the beam is restrained from rotary movement. By this arrangement the rotary inertia of the poise is obviated which is of advantage in some cases, as where a very heavy poise is used or one of relatively great radius. As illustrated in the said Fig. 18 the poise 54 is shown threaded upon a rotating screw rod 55 which is provided with suitable rotating means 56, and is mounted for rotation upon the beam 1. Means for keeping the poise from rotating are provided, herein shown as comprising guides 57 rigid with the beam 1, the said guides engaging in apertures 58 in the poise. The indicating member 59 is shown as rigidly connected to the screw rod 55 to rotate therewith and the indicating member 60 is shown as connected to the said parts so as to receive its proportionate step by step movement. A sliding member 61 is shown mounted to rotate with the screw rod 55 and as being normally held, by suitable means such as a spring 62, out of the path of an annular series of teeth 63 carried upon the indicating member 64, the said indicating member 64 being mounted to rotate upon a fixed part of the machine as shown in the said figure. A stationary cam 65 is provided for causing the member 61 to engage the teeth 63 at the proper time to effect the step by step movement of the member 64. Means are also provided for causing the said member to stop at one of a plurality of predetermined points, which means may consist of a spring detent and V-shaped teeth, as hereinbefore described, and the said means are so shown herein and indicated by reference numeral 66. A casing generally similar to that heretofore described may be used and is so shown herein, being indicated by the reference numeral 38. The arrangement of the other parts of the weighing machine may be generally similar to those previously described and some of the said parts are so shown, others being omitted for the sake of clearness or as being not necessary for illustration in this connection.

In Fig. 19 of the drawings is shown a modification setting forth another arrangement of the poise, its actuating means and the indicating members. In this arangement a poise and its actuating means have a rotary and a longitudinal motion together, while annular indicating members are arranged about the path of travel of the poise and have a rotary motion proportional to the longitudinal motion of the poise. These parts may be inclosed in a casing 38 and are so shown. As illustrated, a poise 67 is threaded upon a fixed screw rod 68 rigidly mounted with reference to the beam. Rigid with the poise and shown integral therewith is a sleeve 69 bearing at its end the actuating means 70. As the actuating means is rotated, it will be obvious that a longitudinal movement will be imparted to the said means and also to the poise. An indicating member 71 is shown mounted within the casing 38 and connected to have rotary motion with the poise by suitable means such as a feather 72 working in a longitudinal slot in the sleeve 69. Two indicating members are shown in the illustration of this modification, a second member 73 being suitably journaled upon the fixed screw rod 68 at 74 and being connected to the poise and the other indicating member so as to receive a step by step movement. As shown, the said connections comprise a sliding member 75 carried upon the indicating member 71 and being normally spring-pressed out of the path of an annular series of teeth 76 carried by the member 73. A stationary cam 77, or a plurality of cams, as may be required by the relation of the indicating members is provided for causing the sliding member to pass into engagement with the teeth to give a step by step movement to the said member 73 at the proper times. Means for causing the indicating member 73 to stop at one of a plurality of predetermined points are also provided and as shown the said means comprise a spring-pressed detent and V-shaped teeth of the general character hereinbefore described and are indicated by the reference numeral 78.

Figure 20:
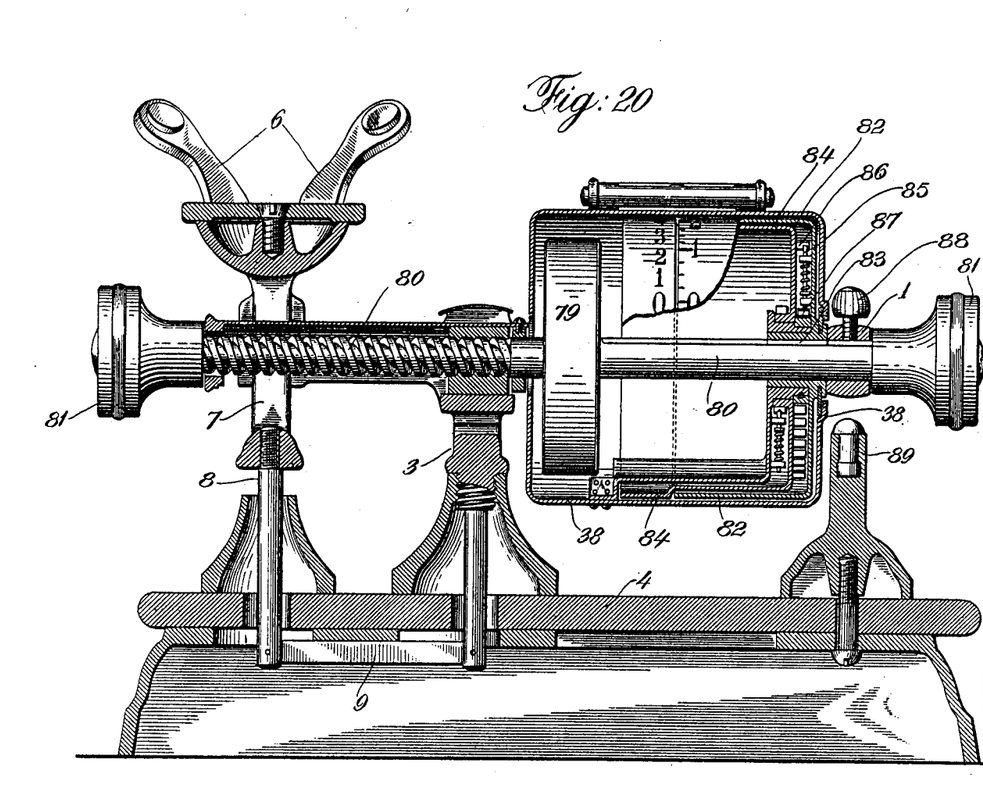
Fig. 20 is a vertical longitudinal section of a modification.

In Fig. 20 of the drawings is shown a modification wherein the poise and its actuating means together with the support for the poise have rotary and longitudinal motion. A plurality of rotatable annular indicating members are arranged about the path of travel of the poise. As herein shown the poise 79 is fixed upon or integral with a rod 80 a portion of which is threaded into a suitable part of the beam 1. At each end of the rod 80 actuating means 81 are provided for the purpose of rotating the rod and thus giving a longitudinal movement thereto. An indicating member 82 is journaled within the casing 38 and has a splined connection with the rod 80 at 83 so as to partake of its rotary motion while restrained from longitudinal motion therewith. A second indicating member 84 is provided also journaled within the said casing and being connected to the indicating member 82 so as to receive a step by step rotary movement proportionate to its graduations. The form of said connections herein shown are of the same general type as those previously described comprising a sliding member 85 carried upon the indicating member 82, an annular series of teeth 86 carried upon the indicating member 84, and a fixed controlling cam 87 for the sliding member. A set screw 88 is shown for the purpose of securing the poise in any adjusted position when this is desirable, as when a series of weight determinations of the same amount are to be successively made. A stop 89 is also shown for the purpose of limiting the vibration of the beam.

It will be understood that various parts may be used with the different forms or modifications herein illustrated and described which are not shown in connection therewith, and parts have been omitted for the purpose of clearness and where it was not necessary to describe such parts in connection with the particular modification.

The operation of the mechanisms herein shown and described will be clear to those skilled in the art from the foregoing description. It will be also understood from the foregoing that a machine has been provided embodying the objects and advantages herein set forth, together with other objects and advantages.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. A weighing machine including in combination, a support for the material to be weighed, a beam, a poise, mechanism mounted on said beam for moving said poise relatively to the beam, means for actuating the mechanism, a plurality of graduated members for indicating the weight of material, said mechanism including connection between the poise and the said indicating members whereby each member is moved in a degree corresponding to its graduations, said indicating members being mounted independently of the poise and arranged to present their respective connections for a single reading.

2. A weighing machine including in combination, a support for the material to be weighed, a beam, a poise, mechanism mounted on said beam for moving said poise relatively to the beam, a plurality of graduated members for indicating the weight of the material, connections between the poise and said indicating members whereby each member is moved in a degree corresponding to its graduations, and a casing mounted independently of the poise and arranged about said indicating means so as to conceal the indicating means adjacent to those portions which are to be read.

3. A weighing machine including in combination a support for the material to be weighed, a beam, a poise, mechanism for moving said poise relatively to the beam, a plurality of graduated members for indicating the weight of the material, connections between the poise and said indicating members whereby each member is moved in a degree corresponding to its graduations, and a casing fixed on the beam and arranged about said indicating means so as to conceal the indicating means with the exception of those portions which are to be read, said casing and indicating members being also arranged so that the weight may be ascertained at a single reading.

4. A weighing machine including in combination a support for the material to be weighed, a beam, a poise, means for moving said poise relatively to the beam, a plurality of graduated members for indicating the weight of the material, said indicating members being mounted independently of the poise to rotate around the path of travel of the poise, and connections between the poise and said indicating members whereby each member is moved in a degree corresponding to its graduations.

5. A weighing machine including in combination a support for the material to be weighed, a beam, a poise, means for moving said poise relatively to the beam, a plurality of graduated members for indicating the weight of the material, said indicating members being mounted to rotate around the path of travel of the poise, connections between the poise and said indicating members whereby each member is moved in a degree corresponding to its graduations, and a casing mounted independently of the poise and arranged about said indicating means so as to conceal the indicating means with the exception of those portions which are to be read.

6. A weighing machine including in combination a support for the material to be weighed, a beam, a poise, means for moving said poise relatively to the beam, a plurality of graduated annular members for indicating the weight of the material, said members being mounted to rotate around the path of travel of the poise, connections between the poise and said indicating members whereby each member is moved in a degree corresponding to its graduations, and a casing arranged about said indicating means so as to conceal the indicating means with the exception of those portions which are to be read.

7. A weighing machine including in combination a support for the material to be weighed, a beam, a poise, means for moving said poise relatively to the beam, a plurality of graduated annular members for indicating the weight of the material, said members being mounted to rotate around the path of travel of the poise, connections between the poise and said indicating members whereby each member is moved in a degree corresponding to its graduations, and a casing arranged about said indicating means so as to conceal the indicating means with the exception of those portions which are to be read, said casing and indicating means being also arranged so that the weight may be ascertained at a single reading.

8. A weighing machine including in combination a support for the material to be weighed, a beam, a poise, means for moving the poise relatively to the beam, a plurality of graduated indicating members mounted to rotate around the path of travel of the poise, connections between the poise and said indicating members, and means for causing the said members to each stop at one of a plurality of predetermined points.

9. A weighing machine including in combination a support for the material to be weighed, a beam, a poise, means for moving the poise relatively to the beam, a plurality of graduated indicating members mounted to rotate around the path of travel of the poise, connections between the poise and indicating members whereby one of said members is given a step by step movement with relation to the continuous movement of the poise, and means for causing said member to stop at one of a plurality of predetermined points.

10. A weighing machine including in combination, a support for the material to be weighed, a beam, a movable poise, mechanism for moving said poise in either direction along said beam, a plurality of indicating members mounted independently of the poise for movement in either direction, and connections between the poise and said indicating members, the connection between the poise and one of said members comprising a cam and means for coöperating with said cam for effecting a step by step movement of said member in either direction.

11. A weighing machine including in combination, a support for the material to be weighed, a beam, a movable poise, mechanism for moving said poise in either direction along said beam, a plurality of indicating members mounted independently of the poise for movement in either direction, and connections between the poise and said members, the connection between the poise and one of said members comprising a stationary cam and movable means for coöperating with said cam to effect a step by step movement of the said indicating member in either direction.

12. A weighing machine including in combination a support for the material to be weighed, a beam, a rotating poise, an indicating member mounted independently of the poise, a member rotatable with the poise and being movable into engagement with said indicating member to effect a step by step movement of the said indicating member with relation to the continuous movement of the poise.

13. A weighing machine including in combination a support for the material to be weighed, a beam, a poise, means for moving the poise relatively to the beam, a plurality of rotary indicating members mounted to rotate around the path of travel of the poise, and means rotating with one of said rotary indicating members for engaging another of said rotary indicating members to effect a step by step movement thereof with relation to the continuous movement of the poise.

14. A weighing machine including in combination a support for the material to be weighed, a beam, a poise, means for moving the poise relatively to the beam, a plurality of rotary indicating members mounted to rotate around the path of travel of the poise, connections between said poise and said indicating members, a sliding member rotating with one of said indicating members, and a stationary cam adapted to coöperate with said sliding member to cause it to pass into engagement with another indicating member so as to give it a step by step rotation.

15. A weighing machine including in combination a support for the material to be weighed, a beam, a poise, a plurality of indicating members mounted to rotate around the path of travel of the poise, means for rotating one indicating member and for giving a longitudinal movement to the poise, and connections between said indicating member and another indicating member for rotating said latter member, said connections being so constructed and arranged that the rotary movement of said indicating members will be proportional in different ratios to the longitudinal movement of the poise.

16. A weighing machine including in combination a support for the material to be weighed, a beam, a poise, a fixed screw rod upon which the poise is threaded, a plurality of rotary indicating members mounted to rotate around the path of travel of the poise, means for rotating one of said members, connections between the said rotating means and the poise for rotating the poise, and connections between the said rotating means and another of said indicating members.

17. A weighing machine including in combination a beam, a poise, means for moving said poise with reference to the beam, a plurality of indicating members mounted to rotate around the path of the poise, connections between the poise and the indicating members, and a casing inclosing the indicating members and having a separate opening therein for each of the indicating members for the purpose of taking a reading therefrom.

18. A weighing machine including in combination, a beam, a poise, means mounted on the beam independently of the poise for moving the poise relatively to the beam, said means including a manually-operated member, a poise driving member, and a motion multiplying device between the manually-operated member and the poise driving member.

19. A weighing machine including in combination, a beam, a poise, and means for moving the poise relatively to the beam, said means including a rotary member mounted on said beam, a manually operated member for turning said rotary member mounted on said beam, and means for modifying the motion of the rotary member with relation to the manually operated member.

20. A weighing machine including in combination a beam, a poise, means for moving the poise relatively to the beam, a support for the material to be weighed connected to one arm of the beam, a plurality of members arranged side by side on the same axis to indicate at a single reading the weight of the material, and a casing, said indicating members and said casing being mounted upon the other arm of the beam independently of the poise, said casing being constructed to conceal the indicating means excepting those portions which are to be read.

21. A weighing machine including in combination a beam, a poise, means for moving the poise relatively to the beam, a support for the material to be weighed connected to one arm of the beam, a plurality of annular members mounted to rotate around the path of travel of the poise for indicating at a single reading the weight of the material, and a casing inclosing the poise and the said indicating members and mounted upon the other arm of the beam, said casing being constructed to conceal the indicating means excepting those portions which are to be read.

22. A weighing machine including in combination, a support for the material to be weighed, a beam, a poise, mechanism for moving the poise relatively to the beam, said mechanism including a rotary member having an axis extending longitudinally of said beam, a plurality of rotary graduated members for indicating the weight of the material, said members having axes extending longitudinally of said beam, and connections between said rotary member and said indicating members whereby each of said indicating members is moved with relation to the poise in a degree corresponding to its graduations.

23. A weighing machine including in combination, a support for the material to be weighed, a beam, a poise, mechanism for moving the poise relatively to the beam including a rotary member having an axis extending longitudinally of said beam, a rotary graduated member for indicating the weight of the material, said graduated member being mounted upon the same axis as the rotary member and connected therewith, a second and differently graduated member for indicating the weight of the material, and connections between the said graduated members whereby each is moved with relation to the poise to a degree corresponding to its graduations.

24. A weighing machine including in combination, a support for the material to be weighed, a beam, a rotary poise having an axis extending longitudinally of the beam, mechanism for rotating said poise to move it along said beam, said mechanism including a rotary member, and a rotary graduated member for indicating the weight of the material, said graduated member being connected with said rotary member whereby said graduated member is moved with relation to the poise in a degree corresponding to the graduation, a second and differently graduated member for indicating the weight of the material and connections between said graduated members whereby each is moved with relation to the poise in a degree corresponding to its graduations.

25. A weighing machine including in combination, a support for the material to be weighed, a beam, a rotary poise having an axis extending longitudinally of the beam, a plurality of rotary indicating members for indicating the weight of the material, said members being mounted on the same axis as the poise and connected therewith whereby each graduated member is moved with relation to the poise in a degree corresponding to its graduations.

26. A weighing machine including in combination, a support for the material to be weighed, a beam, a rotary poise having an axis extending longitudinally of the beam, a plurality of rotary indicating members for indicating the weight of the material, said members being mounted on the same axis as the poise, means for rotating the poise to move it along the beam and connections between the said rotating means and said indicating members whereby each indicating member is moved in a degree corresponding to its graduations.

In testimony whereof, I have signed my name to this specification, in the presence of two subscribing witnesses.

ALFRED C. DODGE.

Witnesses:
MAXWELL LUSTIG,
WM. J. DOLAN.